US011878578B2

(12) United States Patent
Brock et al.

(10) Patent No.: US 11,878,578 B2
(45) Date of Patent: *Jan. 23, 2024

(54) CRADLE ASSEMBLY FOR AN ELECTRIC AXLE ASSEMBLY

(71) Applicant: Dana Heavy Vehicle Systems Group, LLC, Maumee, OH (US)

(72) Inventors: David A. Brock, Maumee, OH (US); Jeremy M. Frenznick, Brighton, MI (US); Brian A. Mattila, Maumee, OH (US); Scott L. Steward, Jr., Maumee, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/450,436

(22) Filed: Oct. 8, 2021

(65) Prior Publication Data
US 2022/0024291 A1    Jan. 27, 2022

Related U.S. Application Data

(63) Continuation of application No. 16/633,776, filed as application No. PCT/US2018/044010 on Jul. 27, 2018, now Pat. No. 11,214,136.
(Continued)

(51) Int. Cl.
*B60K 1/00*    (2006.01)
*B60K 1/02*    (2006.01)
(Continued)

(52) U.S. Cl.
CPC .............. *B60K 1/02* (2013.01); *B60K 7/0007* (2013.01); *B60K 17/043* (2013.01);
(Continued)

(58) Field of Classification Search
CPC ...... B60K 1/02; B60K 7/0007; B60K 17/043; B60K 2001/001; B62D 21/11
See application file for complete search history.

(56) References Cited

U.S. PATENT DOCUMENTS

| | | | |
|---|---|---|---|
| 5,280,957 A | * | 1/1994 | Hentschel ................ B62D 3/12 |
| | | | 280/124.109 |
| 5,992,926 A | | 11/1999 | Christofaro et al. |

(Continued)

FOREIGN PATENT DOCUMENTS

| | | |
|---|---|---|
| DE | 102015212811 A1 | 1/2017 |
| FR | 2975350 A1 | 11/2012 |

(Continued)

OTHER PUBLICATIONS

ISA European Patent Office, International Search Report and Written Opinion Issued in Application No. PCT/US2018/044010, dated Oct. 31, 2018, WIPO, 14 pages.
(Continued)

*Primary Examiner* — Hau V Phan
(74) *Attorney, Agent, or Firm* — McCoy Russell LLP

(57) ABSTRACT

A cradle assembly for housing and supporting a motor and a gearbox of an electric axle assembly. The cradle assembly has generally an "open air" design which provides a space for a motor and/or gearbox to be positioned within a pre-assembled cradle assembly and allows for easy access to the motor and gearbox for maintenance. The cradle assembly includes two end caps, a plurality of tube portions connecting the end caps and a plurality of motor mounts for supporting the motor and gearbox.

20 Claims, 5 Drawing Sheets

Related U.S. Application Data

(60) Provisional application No. 62/538,340, filed on Jul. 28, 2017.

(51) Int. Cl.
*B60K 7/00* (2006.01)
*B60K 17/04* (2006.01)
*B62D 21/11* (2006.01)

(52) U.S. Cl.
CPC ............. *B60K 2001/001* (2013.01); *B60K 2007/0061* (2013.01); *B60Y 2200/91* (2013.01); *B60Y 2410/10* (2013.01); *B62D 21/11* (2013.01)

(56) References Cited

U.S. PATENT DOCUMENTS

| | | | |
|---|---|---|---|
| 5,997,038 A | 12/1999 | Dostert et al. | |
| 6,516,914 B1* | 2/2003 | Andersen | B60K 7/0007 |
| | | | 280/124.179 |
| 6,786,295 B2* | 9/2004 | Herrmann | B62D 21/12 |
| | | | 296/203.02 |
| 7,874,395 B2 | 1/2011 | Taji et al. | |
| 7,946,377 B2* | 5/2011 | Frasch | B62D 21/11 |
| | | | 280/124.109 |
| 8,025,313 B2 | 9/2011 | Tanaka et al. | |
| 8,280,957 B2 | 10/2012 | Wu et al. | |
| 8,479,868 B2 | 7/2013 | Wakatsuki et al. | |
| 8,517,140 B2 | 8/2013 | West et al. | |
| 8,875,834 B1* | 11/2014 | Sirbu | B62D 21/10 |
| | | | 280/124.109 |
| 9,157,507 B2 | 10/2015 | Zimmermann et al. | |
| 9,428,040 B2 | 8/2016 | Shibata et al. | |
| 9,573,452 B2* | 2/2017 | Agnew | B60K 1/00 |
| 9,981,681 B2 | 5/2018 | Dieudonne et al. | |
| 11,214,136 B2* | 1/2022 | Brock | B60K 1/02 |
| 2004/0262588 A1 | 12/2004 | Bronstad | |
| 2010/0066048 A1* | 3/2010 | Buschjohann | B62D 21/02 |
| | | | 280/124.109 |
| 2011/0079978 A1* | 4/2011 | Schreiner | B60G 3/20 |
| | | | 280/124.1 |
| 2017/0174065 A1* | 6/2017 | Bujak | B60K 5/1216 |

FOREIGN PATENT DOCUMENTS

| | | |
|---|---|---|
| KR | 101083744 B1 | 11/2011 |
| KR | 101714253 B1 | 3/2017 |
| WO | 2013029866 A2 | 3/2013 |

OTHER PUBLICATIONS

State Intellectual Property Office of the People's Republic of China, Office Action and Search Report Issued in Application No. 201880047249.4, dated Dec. 3, 2021, 14 pages. (Submitted with Partial Translation).

* cited by examiner

CRADLE ASSEMBLY FOR AN ELECTRIC AXLE ASSEMBLY

CROSS REFERENCE TO RELATED APPLICATIONS

The present application is a continuation of U.S. National Phase application Ser. No. 16/633,776 entitled "CRADLE ASSEMBLY FOR AN ELECTRIC AXLE ASSEMBLY" and filed on Jan. 24, 2020. U.S. application Ser. No. 16/633,776 is a U.S. National Phase of International Patent Application Serial No. PCT/US2018/044010 entitled "CRADLE ASSEMBLY FOR AN ELECTRIC AXLE ASSEMBLY", filed on Jul. 27, 2018. International Patent Application Serial No. PCT/US2018/044010 claims the benefit of U.S. Provisional Application No. 62/538,340 filed Jul. 28, 2017. The entire contents of each of the above-mentioned applications are hereby incorporated by reference in their entirety for all purposes.

BACKGROUND AND SUMMARY

Hybrid and electric vehicles are enjoying increased popularity and acceptance due in large part to the cost of fuel for internal combustion engine vehicles. Electric axles for electric and hybrid vehicles can have an electric machine/motor with an output shaft that runs parallel to the axle of the motor vehicle. To support the electric machine/motor and a transmission, a cradle assembly is needed to provide sufficient strength and stiffness to support the weight of machine/motor and transmission and the load of the vehicle transferred to the cradle assembly.

The cradle assembly disclosed below provides the necessary strength and support for the electric axle assembly while allowing access to the electric machine/motor and/or transmission for maintenance and repair without requiring the disassembly of the cradle assembly itself.

Provided herein is a cradle assembly for housing and supporting a motor, the cradle assembly including: a first end cap and a second end cap, wherein each end cap includes an integrated spring seat, an inner surface, an outer surface, a center portion having a tubular portion extending axially away from the outer surface, and a plurality of legs extending radially outward from the center portion; a plurality of tube portions having a first end and second end, wherein the first end of each tube portion is connected to a radially outer end of a leg of the first end cap and the second end of each tube portion is connected to a radially outer end of a leg of the second end cap; and a plurality of motor mounts connected to an outer surface at least one of the tube portions, wherein the end caps are positioned such that the inner surfaces of the first end cap and second end cap face each other.

In some embodiments, the cradle assembly includes four tube portions and each end cap includes four legs.

In some embodiments, two legs extend radially outward in one direction from the center portion and two legs extend radially outward in the opposite direction.

In some embodiments, each leg is triangular in shape.

In some embodiments, the center portion includes a bore portion from which the tubular portion extends axially from.

In some embodiments, the tubular portions have a mount attached to the axially outer surface thereof.

In some embodiments, the four legs include two upper legs and two lower legs, wherein the upper legs are longer the lower legs.

Provided herein is an electric axle assembly including an electric motor, a gearbox, a cradle assembly as described above, and two axle half shafts, wherein the motor and gearbox are positioned between the two end caps and mounted to the tube portions, and wherein the axle shafts are inserted through the center portions of the end caps and driving connected to the motor and gearbox.

In some embodiments, the further includes a skid plate attached to the end caps of the cradle assembly.

In some embodiments, the skid plate includes a set of rails and a two attachment pieces, the rails extend between the two attachment pieces, and one attachment piece is attached to one end cap and the other attachment pieces is attached to the other end cap.

BRIEF DESCRIPTION OF THE DRAWINGS

The above, as well as other advantages of the embodiments of the invention will become readily apparent to those skilled in the art from the following detailed description when considered in the light of the accompanying drawings.

DETAILED DESCRIPTION

Figure 1:
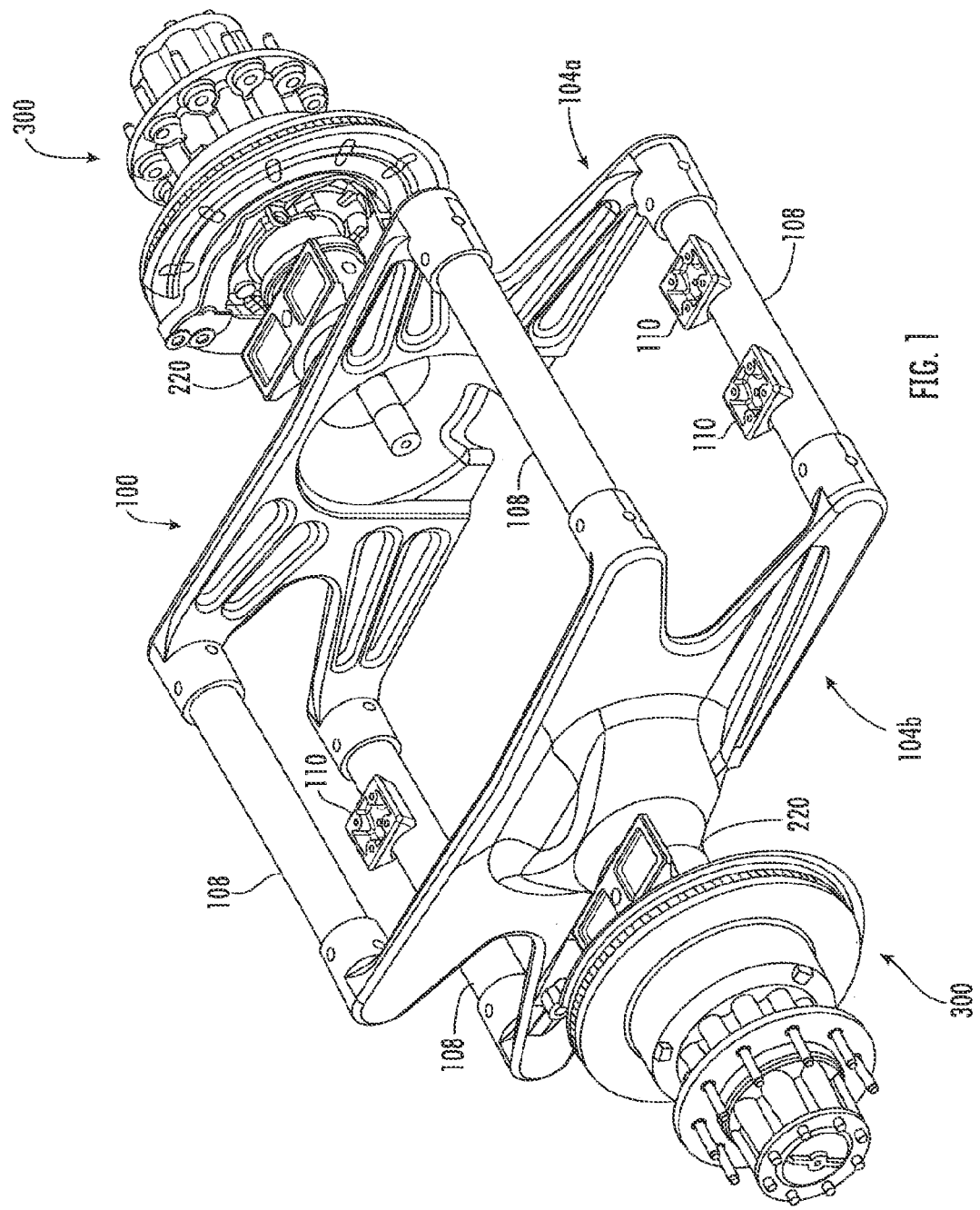
FIG. 1 is an isometric view of a preferred embodiment of a cradle assembly.

It is to be understood that the embodiments may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Provided herein is a cradle assembly for use with a vehicular body and frame assembly.

Motor vehicles typically include a body and frame assembly which is supported upon a plurality of ground-engaging wheels by a resilient suspension system. Additionally included are specialized structures for supporting the engine and/or motors of the vehicle thereon.

An engine/motor support structure, which is commonly referred to as a cradle, is frequently embodied as a generally U-shaped member having engine/motor mount portions and body mount portions formed thereon. The mount portions are provided for facilitating the connection of the engine and/or motor to the cradle, while the body mount portions are provided for facilitating the connection of the cradle to the body and frame assembly of the vehicle. Usually, bolts or similar fasteners are used to provide the various connections between the engine/motor, the cradle assembly, and the body and frame assembly. Thus, the cradle assembly securely supports the engine/motor on the body and frame assembly of the vehicle during use.

The assemblies disclosed herein are applicable to hybrid electric vehicles (HEVs), electric vehicles (EVs) and Fuel Cell Hybrid systems. Embodiments disclosed herein are directed to hybrid vehicles for use in electric axle or hybrid electrical vehicle drivetrain.

Provided herein is a cradle assembly for housing and supporting a motor and a gearbox for an electric or hybrid electric motor vehicle (HEV).

It should be noted that hydro-mechanical components such as hydromotors, pumps, accumulators, among others, are capable of being used in place of the electric machines indicated in the figures and accompanying textual description.

More specifically, the cradle assembly houses an electric motor and gearbox for an electric axle assembly. More specifically, disclosed is an electric axle assembly used to drive the rear wheels of a commercial vehicle.

Depicted in FIG. 1 is one preferred embodiment of a cradle assembly 100.

In some embodiments, the cradle assembly 100 includes a first and a second end cap 104a, 104b, a plurality of tube portions 108 and a plurality of motor mounts 110.

Figure 3:
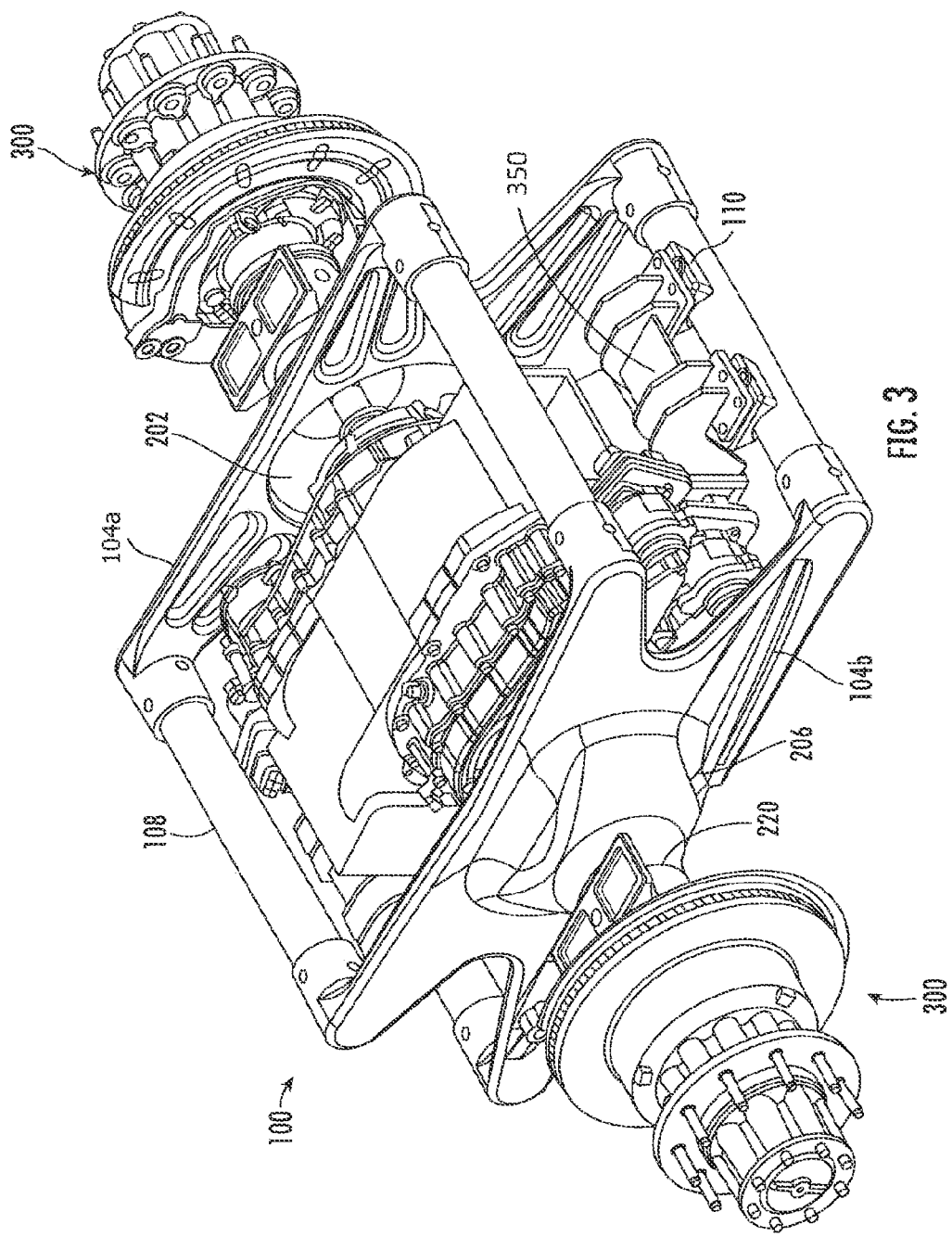
FIG. 3 is an isometric view of the cradle assembly of FIG. 1 with a motor and gearbox installed.

The cradle assembly 100 has a generally an "open air" design which provides a space or void 102 for a motor and/or gearbox assembly 350 to be positioned therein as depicted in FIG. 3.

In some embodiments, the end caps 104a, 104b are made of an iron-carbon alloy or cast iron.

Referring back to FIGS. 1-2, n some embodiments, the end caps 104a, 104b include an integrated spring seat 230.

Figure 2:
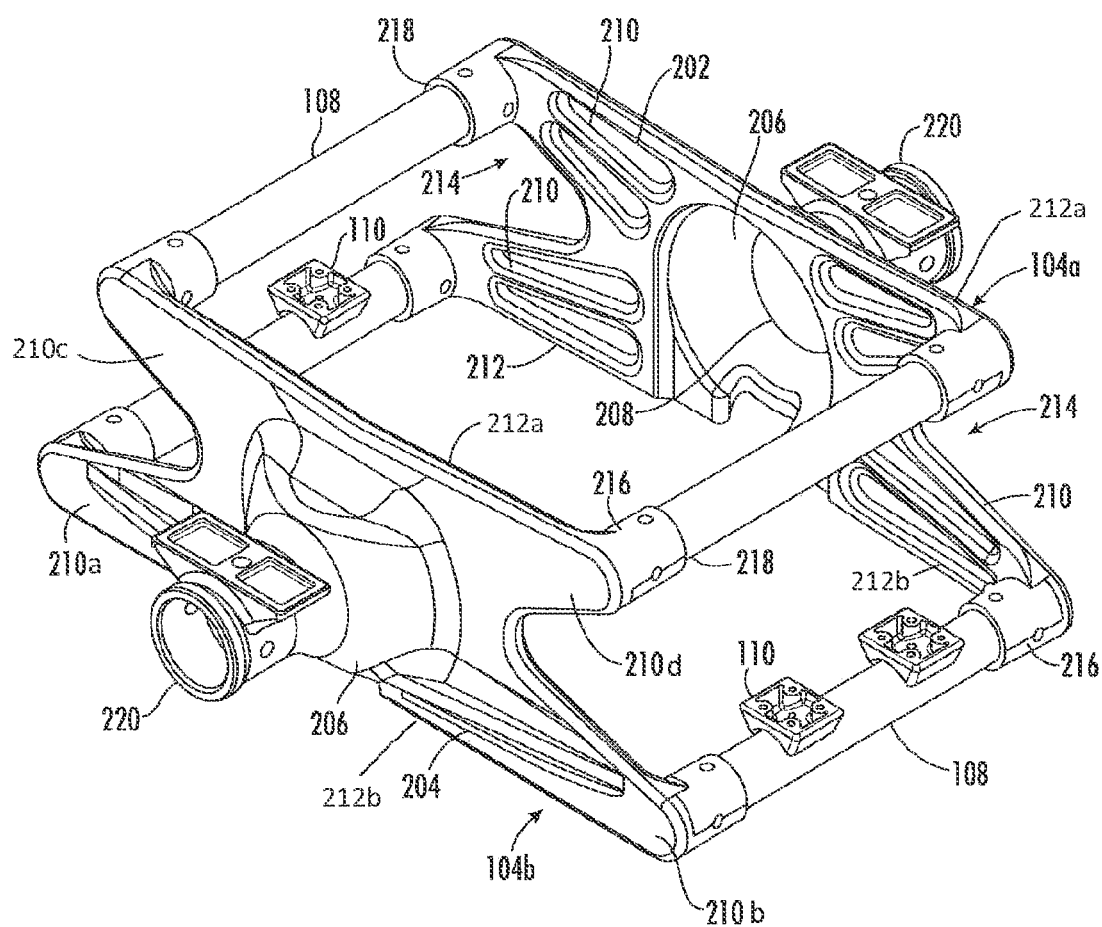
FIG. 2 is an isometric view of the cradle assembly of FIG. 1 with the tube assemblies removed.

As depicted in FIGS. 1-2, each end cap 104a, 104b has an inner surface 202, an outer surface 204 and a center cradle portion 206 having a bore portion 208.

The two end caps 104a, 104b are positioned such that the inner surfaces 202 of each end cap 104a, 104b face each other and the bore portions 208 define an axis A.

The center cradle portion 206 is defined substantially by the bore portion 208. Extending radially outward from the center portion 206 is a plurality of legs 210.

In some embodiments, the end caps 104a, 104b have four legs 210 extending from the center portion 206.

In some embodiments, two legs extend radially outward in one direction from the center portion 206 and two legs extend radially outward in the opposite direction from the center portion 206.

In some embodiments, the legs 210 are substantially triangular in shape, providing a substantially continuous straight outer edge 212 from the center cradle portion 206 to the end of the leg 210 and an open space 214 between radially inner portions of the legs 210 extending in the same radial direction.

In some embodiments, the end caps 104a, 104b has an upper edge 212a and a lower edge 212b.

In some embodiments, the upper edge 212a and lower edge 212b are parallel to each other.

Each leg 210 terminates in a connecting portion 216.

In some embodiments, the connecting portion 216 has an aperture 218 extending perpendicular from the end of the leg 210. The aperture 218 faces axially inward such that the apertures 218 of one end cap 104a align and face the apertures 218 of the other end cab 104b.

In some embodiments, the legs 210 are of equivalent length.

In some embodiments, the end caps 104a, 104b include two lower legs 210a, 210b and two upper legs 210c, 210d.

Figure 4:
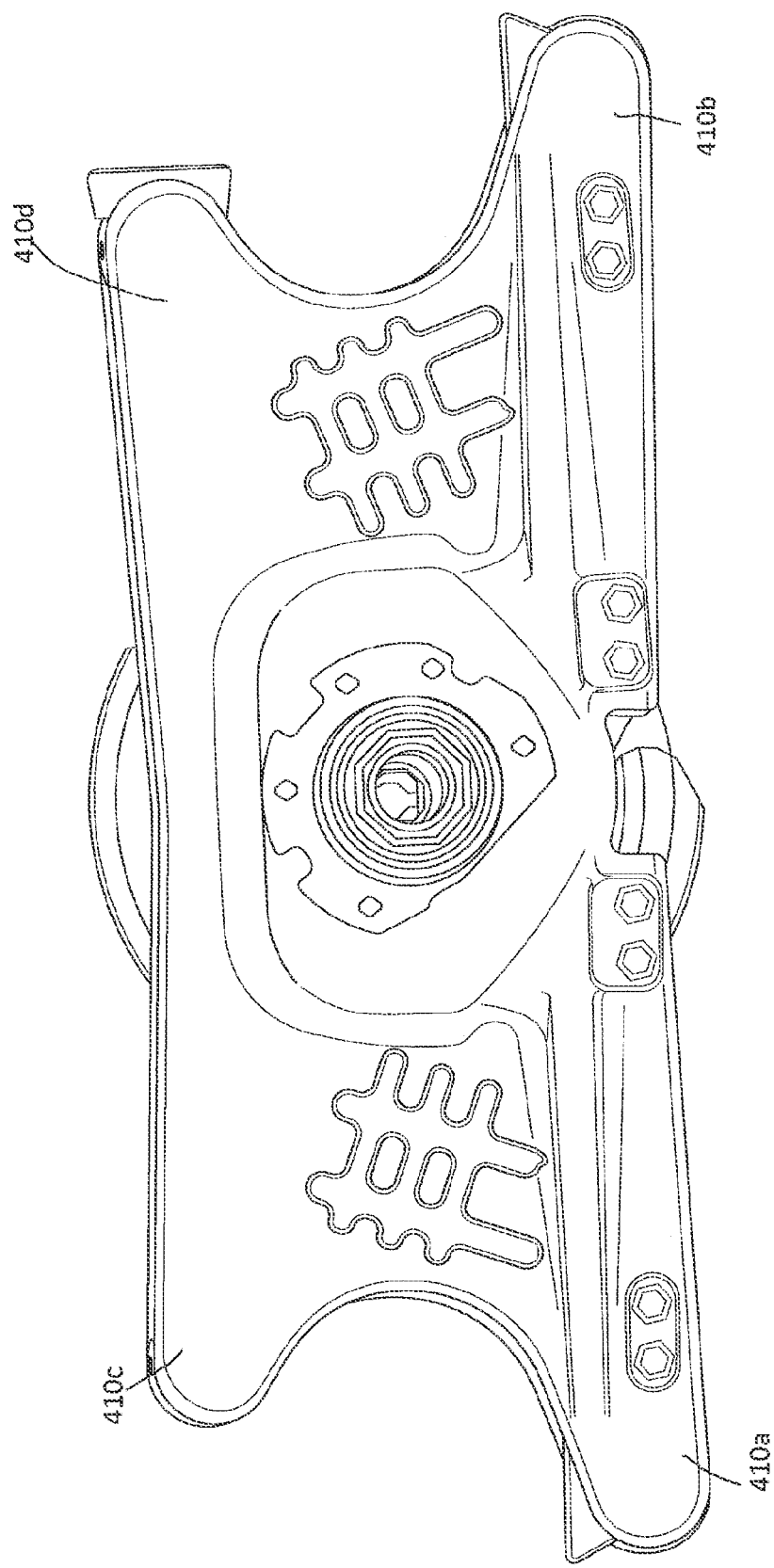
FIG. 4 is a side view of the another preferred embodiment of an end cap.

As depicted in FIG. 4, in some embodiments, the end caps 104a, 104b include lower legs 410a, 401b that are longer than the upper legs 410c, 3410d.

Referring back to FIGS. 1-3, in some embodiments, the connecting portions 216, legs 210 and center portion 206 are an integral piece.

In some embodiments, the cradle assembly 100 includes a plurality of tube portions 108 that connect the two end caps 104a, 104b to each other.

The number of tube portions 108 corresponds to the number of legs 210 on each end cap 104a, 104b.

One axial end of a tube portion 108 is inserted into an aperture 218 of one end cap 104a and the other axial end is inserted into a corresponding aperture 218 of the other end caps 104b.

In some embodiments, the tube portions 108 are press fit into the end caps 104a, 104b, then secured into place by welding, for example.

The tube portions 108 and the end caps 104a, 104b define an open space 102 for which an electric motor and gearbox can be positioned.

In some embodiments, at least two of the tube portions 108 have mounts 110 on the outer surface thereof.

In some embodiments, the mounts 110 face radially inward.

As shown in FIG. 2, in some embodiments the mounts 110 are positioned on the radially lower two tube portions 108.

The bore portion 208 is an axially extending aperture portion that extends axially away from the outer surface 204 of the center cradle portion 206 of the end cap 104a, 104b.

In some embodiments, as shown in FIGS. 1-3, the bore portions 208 have a substantially tubular portion 220 that extends axially away from the outer surface 204 of the end caps 104a, 104b.

In some embodiments, the tubular portion 220 provides an outer surface on which a tube assembly 300 can be press fit onto as shown in FIGS. 1 and 3. Once the tube assembly 300 is press fit on to the tubular portion 220, it can then be secured into place by welding, for example. The tube assemblies 300 are used to mount hub and rotor assemblies, braking components and other components of the axle assemblies.

Once the tube assemblies 300, tube portions 108 and end caps 104a, 104b are assembled, a motor and/or gearbox assembly 350 can be placed within the cradle assembly 100 in the open space 102 and secured to the mounts 110 of the tube portions 108 as shown in FIG. 3.

In some embodiments, a skid plate and/or other guards (not shown) may also be attached or integrally added cradle assembly 100 to protect the motor/generator and/or engine, as deemed necessary and desirable for safety and durability. Safety features, such as the aforementioned guards may, of course, vary among different vehicle and equipment applications, and are not described in detail herein.

Figure 5:
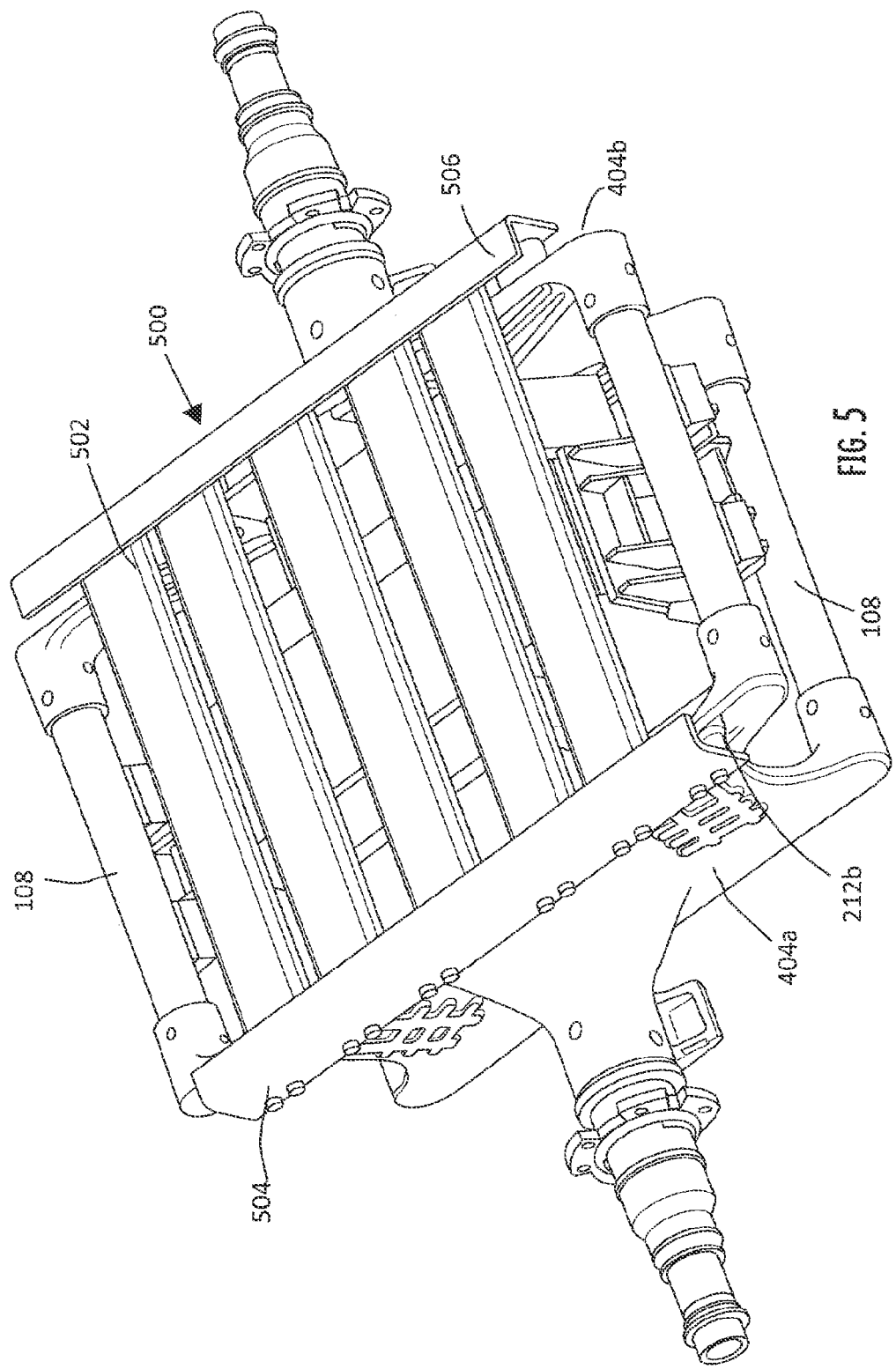
FIG. 5 is an isometric view of the cradle assembly of FIG. 5 with a skid plate.

In some embodiments, a skid plate 500 is connected to the each of the end caps 104a, 104b as depicted in FIG. 5.

In some embodiments, the skid plate 300 is positioned beneath the motor/gearbox assembly to provide protection thereto.

In some embodiments, the skid plate 500 includes several rails or tubes 502 attached to two attachment pieces 504, 506. The attachment pieces 504, 506 are directly attached to the outer surface 204 of the end caps 104a, 104b.

In some embodiments, the attachment pieces 504, 506 extend over the outer lower edges 212b of the end caps 404a, 404b.

In some embodiments, the rails 502 are positioned equidistant from each other extending the length of the end caps 404a, 404b between the tube portions 108

In some embodiments, the cradle assembly 100 is part of an electric axle assembly having axle shafts can be inserted through the bores of the tube assemblies 300 and the cradle center portions 206 and connected to the motor and gearbox accordingly.

By being an "open air" design, the motor and/or gearbox can be installed and secured to a pre-assembled cradle assembly 100 allowing both the motor/gearbox assembly 350 to be removed and re-installed easily for service.

In some embodiments, the gearbox is a drive ratio-adjusting device including an assembly of gears, clutches, actuators and other components typically used in transmissions. In some embodiments, the gearbox can be, but is not limited to, a dual clutch transmission, an automatic mechanical transmission, a manual gearbox or an automatic gearbox.

Additionally, the cradle assembly 100 supports the vehicle load without transferring any of the load to the gearbox.

In some embodiments, the motor is an electric motor/generator.

In some embodiments, the motor/gearbox assembly 350 includes a battery. It should be noted that the battery is capable of being not just a high voltage pack such as lithium ion or lead-acid batteries, but also ultracapacitors or other pneumatic/hydraulic systems such as accumulators, or other forms of energy storage systems.

The motor/generators described herein are capable of representing hydromotors actuated by variable displacement pumps, electric machines, or any other form of rotary power such as pneumatic motors driven by pneumatic pumps. However, it is understood that other embodiments may include other power sources including energy storage devices or electrochemical energy conversion devices or combinations thereof including, but not limited to, an ultracapacitor or a fuel cell particularly in a fuel cell electric vehicle drivetrains (FCEV).

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

Aspects of the invention include:

Aspect 1. A cradle assembly for housing and supporting a motor, the cradle assembly including:
a first end cap and a second end cap, wherein each end cap includes an integrated spring seat, an inner surface, an outer surface, a center portion having a tubular portion extending axially away from the outer surface, and a plurality of legs extending radially outward from the center portion;
a plurality of tube portions having a first end and second end, wherein the first end of each tube portion is connected to a radially outer end of a leg of the first end cap and the second end of each tube portion is connected to a radially outer end of a leg of the second end cap; and
a plurality of motor mounts connected to an outer surface of at least one of the tube portions,
wherein the end caps are positioned such that the inner surfaces of the first end cap and second end cap face each other.

Aspect 2. The cradle assembly of Aspect 1, further including four tube portions and wherein each end cap include four legs.

Aspect 3. The cradle assembly of Aspect 2, wherein two legs extend radially outward in one direction from the center portion and two legs extend radially outward in the opposite direction.

Aspect 4. The cradle assembly of Aspect 3, wherein each leg is triangular in shape.

Aspect 5. The cradle assembly of Aspect 1, wherein the center portion includes a bore portion from which the tubular portion extends axially from.

Aspect 6. The cradle assembly of Aspect 1, wherein the tubular portions have a mount attached to the axially outer surface thereof.

Aspect 7. The cradle assembly of Aspect 2, wherein the four legs include two upper legs and two lower legs, wherein the upper legs are longer the lower legs.

Aspect 8. An electric axle assembly including:
an electric motor;
a gearbox;
a cradle assembly of Aspects 1-7; and two axle half shafts,
wherein the motor and gearbox are positioned between the two end caps and mounted to the tube portions, and
wherein the axle shafts are inserted through the center portions of the end caps and driving connected to the motor and gearbox.

Aspect 9. The electric axle assembly of Aspect 8, further comprising a skid plate attached to the end caps of the cradle assembly.

Aspect 10. The electric axle assembly of Aspect 9, wherein the skid plate includes a set of rails and a two attachment pieces, wherein the rails extend between the two attachment pieces, and wherein one attachment piece is attached to one end cap and the other attachment pieces is attached to the other end cap.

The invention claimed is:

1. A cradle assembly for a motor assembly, the cradle assembly comprising:
a first end cap, a second end cap, and a plurality of legs extending radially outward from a center portion of each end cap;
a plurality of tube portions connecting each leg of the first end cap to a respective leg of the second end cap, each tube portion connected to one of the legs of the first end cap at a first end and connected to one of the legs of the second end cap at a second end; and
an electric motor and a gearbox of the motor assembly mounted between the first end cap and the second end cap, and two axle shafts passing through a tubular portion of each center portion and connected to each side of the motor assembly.

2. The cradle assembly of claim 1, wherein the center portion of each end cap comprises a bore, and each bore receives one of the axle shafts, and
each leg of each end cap comprises an aperture receiving one of the tube portions.

3. The cradle assembly of claim 1, wherein two of the plurality of legs extend in a first direction and two of the plurality of legs extend in a second direction opposite of the first direction.

4. The cradle assembly of claim 1, further comprising a skid plate comprising rails or tubes extending between the first end cap and the second end cap below the tube portions.

5. The cradle assembly of claim 1, further comprising motor mounts positioned on two of the plurality of tube portions.

6. The cradle assembly of claim 1, wherein two of the plurality of legs are longer than another two of the plurality of legs.

7. The cradle assembly of claim 1, wherein a wheel hub is connected to each tubular portion and the axle shafts are connected to the wheel hubs.

8. An electric axle assembly comprising:
a cradle assembly, the cradle assembly comprising:
a first end cap, a second end cap, and a plurality of legs extending radially outward from a center portion of each end cap;
a plurality of tube portions connecting each leg of the first end cap to a respective leg of the second end cap, each tube portion connected to one of the legs of the first end cap at a first end and connected to one of the legs of the second end cap at a second end;
an electric motor and a gearbox mounted between the first end cap and the second end cap; and
two axle half shafts inserted through a tubular portion of each center portion.

9. The electric axle assembly of claim 8, further comprising a skid plate attached to the first end cap and the second end cap.

10. The electric axle assembly of claim 8, further comprising a skid plate attached to the first end cap and the second end cap, and the skid plate including a set of rails extending between two attachment pieces.

11. The electric axle assembly of claim 8, wherein the center portion of each end cap comprises a bore, and each bore receives one of the two axle half shafts.

12. The electric axle assembly of claim 8, further comprising mounts positioned on two of the plurality of tube portions, the mounts connecting the electric motor and the gearbox to the tube portions.

13. The electric axle assembly of claim 8, further comprising tube assemblies connected to the tubular portions, the tube assemblies connecting wheel assemblies to the cradle assembly.

14. The electric axle assembly of claim 8, wherein the electric motor and the gearbox are mounted within the assembled cradle assembly.

15. A cradle assembly for a motor assembly, the cradle assembly comprising:
a first end cap, a second end cap, and a plurality of legs extending radially outward from a center portion of each end cap, and a tubular portion of each center portion axially aligned with the tubular portion of the other center portion;
a plurality of tube portions connecting each leg of the first end cap to a respective leg of the second end cap, each tube portion connected to one of the plurality of legs of the first end cap at a first end and connected to one of the plurality of legs of the second end cap at a second end; and
a motor and a gearbox of the motor assembly mounted between the first end cap and the second end cap, and two axle shafts passing from each side of the motor assembly through a tubular portion of each center portion to an outer side of each center portion.

16. The cradle assembly of claim 15, wherein each tubular portion comprises a bore, and each bore receives one of the axle shafts, and wherein each tubular portion extends outward from the center portion along a respective shaft.

17. The cradle assembly of claim 15, wherein central axes of each of the plurality of legs and each tubular portion align.

18. The cradle assembly of claim 15, wherein each tubular portion extends outward from the respective center portion along an axis connecting bores of the central portions.

19. The cradle assembly of claim 15, wherein a tube assembly is mounted onto each tubular portion and a wheel hub assembly is mounted to each tube assembly.

20. The cradle assembly of claim 15, wherein the electric motor and the gearbox is mounted within the assembled cradle assembly, and the shafts are inserted into each tubular portion and connected to the motor and the gearbox.

\* \* \* \* \*